(12) United States Patent
Humphrey et al.

(10) Patent No.: US 6,396,853 B1
(45) Date of Patent: May 28, 2002

(54) PROVIDING DATA SERVICES TO TELECOMMUNICATIONS USER TERMINALS

(75) Inventors: Leslie Derek Humphrey, Harlow; Brian Michael Unitt, Bishop's Stortford, both of (GB)

(73) Assignee: Nortel Networks Limited, St. Laurent (CA)

( * ) Notice: Subject to any disclaimer, the term of this patent is extended or adjusted under 35 U.S.C. 154(b) by 0 days.

(21) Appl. No.: 09/086,116

(22) Filed: May 28, 1998

(51) Int. Cl.[7] .................................................. H04J 3/24
(52) U.S. Cl. ....................... 370/535; 370/537; 370/474; 370/473; 370/395.6; 370/395.42
(58) Field of Search ................................. 370/535, 532, 370/905, 465, 466, 467, 468, 458, 437, 431, 412, 473, 474, 477, 395, 389, 294, 395.6, 395.42, 537

(56) References Cited

U.S. PATENT DOCUMENTS

| | | | | |
|---|---|---|---|---|
| 5,327,428 A | * | 7/1994 | Van as et al. | 370/532 |
| 5,392,280 A | * | 2/1995 | Zheng | 370/431 |
| 5,446,734 A | * | 8/1995 | Goldstein | 370/532 |
| 5,557,608 A | * | 9/1996 | Calvignac et al. | 370/431 |
| 5,793,760 A | * | 8/1998 | Chopping | 370/532 |
| 5,802,050 A | * | 9/1998 | Petersen et al. | 370/395 |
| 5,802,051 A | * | 9/1998 | Petersen et al. | 370/395 |
| 5,822,321 A | * | 10/1998 | Petersen et al. | 370/474 |
| 5,946,309 A | * | 8/1999 | Westberg et al. | 370/395 |
| 5,978,375 A | * | 11/1999 | Petersen et al. | 370/395 |
| 6,052,386 A | * | 4/2000 | Achilleoudis et al. | 370/474 |
| 6,229,821 B1 | * | 5/2001 | Bharucha et al. | 370/471 |

* cited by examiner

Primary Examiner—Wellington Chin
Assistant Examiner—Frank Duong
(74) Attorney, Agent, or Firm—Lee, Mann, Smith, McWilliams, Sweeney & Ohlson

(57) ABSTRACT

Voice and data traffic are transported over a digital subscriber loop by multiplexing one or more plesiochronous packet data channels together with lower priority asynchronous traffic into a single composite data stream for transmission over the loop. The plesiochronous data packets each comprise a number of bytes together with a header element containing channel identification information and a packet length indicator. Each plesiochronous data packet is assigned a transmission time such that the desired nominal data rate for the plesiochronous channel is achieved when packets containing the preferred number of bytes are transmitted at the preferred time intervals.

12 Claims, 9 Drawing Sheets

PROVIDING DATA SERVICES TO TELECOMMUNICATIONS USER TERMINALS

This invention relates to arrangements and methods for digital data services to user terminals in a telecommunications network.

BACKGROUND OF THE INVENTION

In today's telecommunications networks there is a growing requirement for transmission of bursty, packet oriented data traffic such as that which arises when desktop computers are linked together using Internet Protocol. Often it is advantageous to provide the facility to mix packet data traffic, which tends to be bursty in nature, with other traffic such as digitised voice circuits, which require constant and regular bandwidth, on a single transmission bearer. While this facility is now becoming available in transport networks, it is not generally available in access networks between the premises of the end customers of a telecommunications network provider and the nearest point of presence in the operator's network. Known technologies such as Asymmetric Digital Subscriber Line (ADSL) and Very high speed Digital Subscriber Line (VDSL) operate over standard telephony subscriber loop or twisted pair customer connections and offer bit rates from 1.5 Mbit/s to 25 Mbit/s, depending on the technology used and the distance to be covered. In such systems, the loop may carry both the digital data and analogue voice traffic, the two services being separated by splitters or filters. Those customers having a high speed digital access connection such as VDSL could benefit from a more flexible use of the digital link.

SUMMARY OF THE INVENTION

An object of the invention is to minimise or to overcome the above disadvantage.

A further object of the invention is to provide an improved arrangement and method for providing voice and data access to a user terminal over a subscriber loop.

According to a first aspect of the invention there is provided a method of multiplexing one or more plesiochronous packet data channels together with lower priority asynchronous traffic into a single composite data stream for transmission over a transmission link, said plesiochronous data packets each comprising a number of bytes together with a header element containing channel identification information and a packet length indicator; the method comprising assigning to each said plesiochronous data packet a transmission time such that the desired nominal data rate for the plesiochronous channel is achieved when packets containing the preferred number of bytes are transmitted at the preferred time intervals.

The method provides a means whereby one plesiochronous data stream or a plurality of plesiochronous data streams having the same or differing nominal bit rates can be multiplexed together with bursty packet data streams onto a single transmission bearer.

It will be understood that a synchronous data stream, where the bit rate bears a known, exact and constant relationship to a local clock signal source, is a special case of a plesiochronous stream, where the bit rate tolerance is zero. Thus the methods an d systems described here can be equally applied where one or more of the component streams is synchronous with respect to a local clock signal.

Groups of contiguous bytes from an input stream are encapsulated into a data packet or mini-cell. Mini-cells from individual input streams are multiplexed together according to a set of rules which determine how many contiguous bytes from an input stream are collected into a single mini-cell and in which order the mini-cells from separate input data streams are multiplexed together. Each mini-cell carries header information which conveys the channel identity and specifies the length of each mini-cell, and carries delineation information. The information contained in mini-cell headers allows the original data streams to be reconstructed at the receiving demultiplexer.

In a preferred implementation of this invention, the data packets used for the multiplexed transmission data stream are mini-cells according to ITU draft recommendation I.363.2 operating without encapsulation in ATM cells.

According to a further aspect of the invention, there is provided apparatus for multiplexing one or more plesiochronous packet data channels together with lower priority asynchronous traffic into a single composite data stream for transmission over a transmission link, said plesiochronous data packets each comprising a number of bytes together with a header element containing channel identification information and a packet length indicator; the apparatus comprising means for assigning to each said plesiochronous data packet a transmission time such that the desired nominal data rate for the plesiochronous channel is achieved when packets containing the preferred number of bytes are transmitted at the preferred time intervals In a further embodiment, there is included in the mini-cells generated from plesiochronous data streams a parameter from which the position in the mini-cell of the frame boundary (for structured streams) or an artificially established frame boundary (for non structured streams) can be deduced. This parameter information is then used by the demultiplexing equipment to verify that the correct number of plesiochronous data bytes have been received and that no plesiochronous mini-cells have been lost due to errors on the transmission medium. In yet a further embodiment, there is included periodically in the multiplexed transmission stream a special delineation mini-cell. The payload of this delineation mini-cell contains a known or predictable bit pattern. In the event of loss of mini-cell delineation at the receiver, the receiver will search for a three byte sequence which passes the header error check test. Should the channel identifier (CID) derived from this supposed header match the CID of a delineation mini-cell and the length indicator correspond to the length of a delineation mini-cell then the receiver will check that the supposed payload also matches the expected payload of a delineation mini-cell. If all these criteria are fulfilled then there is a high degree of confidence that the true mini-cell boundaries have been located.

Advantageously, the multiplexer may impose a frame structure on the output data stream by periodically inserting a frame marker in the multiplexed output stream at a known time measured with respect to the clock frequency of the multiplexed data stream. This frame marker consists of a bit pattern which is identifiable at the receiving demultiplexer and a pointer from which the position of the start of the next mini-cell can be deduced in the event of loss of mini-cell delineation at the receiver.

In addition to carrying bursty packet oriented user data, a multiplexed bursty transmission capability could also be used to carry an embedded operations channel (EOC) for monitoring and control purposes.

The invention thus provides a flexible, robust and simple system whereby asynchronous bursty packet data and fixed bit rate so called plesiochronous data can be multiplexed onto a single transmission system.

A plesiochronous data stream is defined herein as a one bit serial transmission signal whose actual clock frequency when measured over a long time interval may depart from its nominal value by a small amount. Such data streams are extensively used in telecommunications networks. An example of such a stream is a 2048 kbit/s transmission stream according to the International Telecommunications Union (ITU) recommendation G.703. According to the recommendation, signals with a nominal data rate of 2048 kbit/s may depart from their nominal frequency by up to 50 parts per million.

In some applications, telecommunications service providers offer a plesiochronous service connection where the content of the data stream is determined entirely by the customer. The United Kingdom telecommunications operator BT provides such a service under the name 'Megastream'. An example application of such a connection would be as a link between the data networks on two geographically separate sites of a single company.

In other applications, the content of the data stream is structured in a known way. Many telecommunications services use a structure based on frames of 125 ms length, such as defined in ITU recommendation G.704. At the nominal rate of 2048 kbit/s, such a frame contains 32 channels of eight bits (one byte) each. According to G.704, the first byte in alternate frames contains, amongst others, a known bit pattern which can be used to achieve frame alignment, allowing the remainder of the byte oriented information to be extracted. Conventionally, a structured signal running nominally at 2048 kbit/s contains, in addition to the framing channel, 30 end user channels plus one signalling channel, each having a nominal capacity of 64 kbit/s. An example application of such a structured connection is to link a Private Branch Exchange (PBX) on a business customer's premises to the telecommunication network provider's local switching facility.

In some circumstances, not all end user channels within a structured plesiochronous data stream will be used. For example, a business customer may not immediately require say 30 external telephone lines, yet for convenience the network provider is likely to install a standard connection. A transmission scheme which allows such unused capacity to be reused for other traffic could then offer financial and operational advantages.

To achieve economy of transmission links it is often desirable to multiplex a number of component streams together onto a single link running at a correspondingly higher bit rate. Where the component streams are plesiochronous signals, the multiplexing equipment must adapt each stream to the clock rate of the multiplexed link. ITU recommendation G.742 specifies a method for adapting four plesiochronous 2048 kbit/s streams into a single stream of 8448 kbit/s. Where a component stream is running at an actual clock rate higher than the nominal rate, opportunities are provided in the multiplex frame structure to transmit periodically the resulting extra information, together with a control indicator to signal that extra information has been inserted. Conversely, if a component stream is running more slowly than its nominal rate, opportunities are provided in the multiplex frame structure to drop information and signal that information has been dropped. The demultiplexing equipment can then examine the control signals and reconstruct the original component streams at their original bit rates without loss or gain of information.

Such multiplexing schemes are widely used in the telecommunications industry, but are relatively inflexible in application. In practice, a company might require, for example, a structured partially filled 2048 kbit/s connection from the site PBX to the local telephone operator's switch, an unstructured 2048 kbit/s connection to another site to carry legacy data services, and a number of asynchronous bursty packet data connections to be routed by a local telecommunications operator to an Internet Service Provider and a number of other company sites. Furthermore, the balance of communication requirements might change on a time of day or time of week basis when the requirement for voice circuits is reduced overnight and at weekends. A more flexible multiplexing scheme as envisaged herein could offer both an improved service and reduced costs to both the operator and the operator's customer.

In preferred embodiment of the invention, traffic over the subscriber loop is carried in mini-cells such as defined for Asynchronous Transfer Mode (ATM) Adaptation Layer 2 (AAL2) in ITU draft recommendation I.363.2. Mini-cells comprise a header section having a fixed length of three bytes and a payload section having a variable length of up to 64 bytes. The header is transmitted first with the payload following immediately. The header contains, amongst others, fields specifying the identity of the attached payload channel (CID) and an indication of the length of the payload (LI). The CID and LI fields are 8 bits and 6 bits, respectively. Additionally, the header contains an error check field (HEC) of length 5 bits from which errors which may occur in the header during transmission of a mini-cell stream over an error-prone transmission link can be detected at the receiving node.

Initially, it was intended that AAL2 mini-cells should be transmitted within the payload of ATM cells. However, it is known that mini-cells can also be transmitted without using this encapsulation mechanism. In such a transmission system, the receiving entity must be able to identify the boundaries of the received mini-cells in order to extract correctly the transmitted data. For example, this may be done by hunting for a three byte sequence which, when submitted to the header error check process, registers no errors. This three byte sequence is then either a valid mini-cell header or another group of data bytes which happen to pass the error check. By extracting the payload length indicator (LI) from this supposed mini-cell header, a prediction of the location in the received byte stream of the next mini-cell header can be made. If this group of three bytes also passes the error check, then confidence is increased that the true mini-cell boundaries have been located. Further checks are made at subsequent predicted mini-cell header positions until confidence is increased to any level desired by the system designer. The process of identifying the mini-cell boundaries is known as delineation.

BRIEF DESCRIPTION OF THE DRAWINGS

An embodiment of the invention will now be described with reference to the accompanying drawings in which.

DESCRIPTION OF PREFERRED EMBODIMENT

To illustrate the operation of this invention we describe first the multiplexed byte stream which arises from use of this invention under different circumstances. Later we describe example systems which can be used to multiplex and demultiplex plesiochronous and bursty component data streams.

Figure 1:
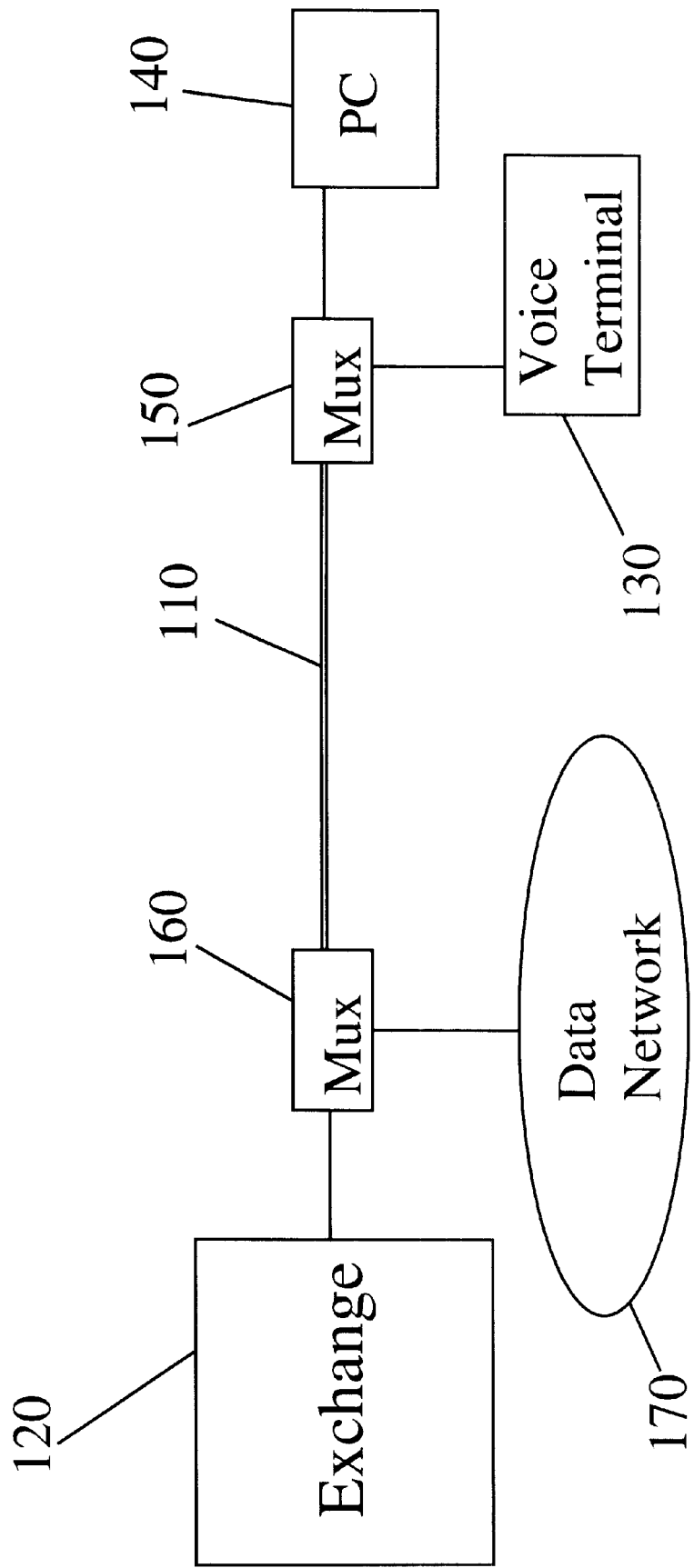
FIG. 1 is a schematic diagram of an access system between a subscriber and a local exchange.

Referring first to FIG. 1, this depicts in schematic form a network access arrangement for a subscriber having both voice and data services provided digitally via a twisted pair subscriber loop 110 from a local exchange 120. Voice (plesiochronous) services for a voice terminal 130, which may alternatively comprise a private branch exchange (PBX) on a small business site, and data services for a data terminal 140 are multiplexed together by multiplexers 150 and 160 disposed respectively at the subscriber and exchange ends of the loop. At the local exchange site, voice services may be provided from conventional telephone exchange equipment while data traffic is typically connected to a data network 170 via multiplexer 160. The traffic on the loop is multiplexed into asynchronous mini-cells as will be described below. The data traffic is asynchronous data traffic at least part of which may comprise an embedded operations channel.

Figure 2:
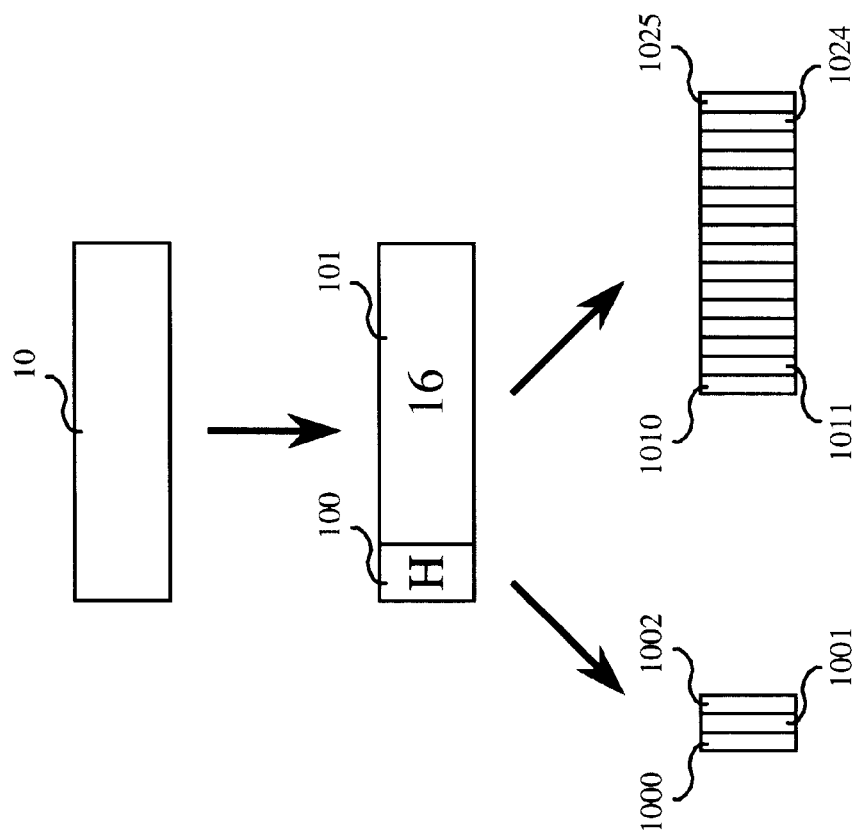
FIG. 2 represents the format of a mini-cell employed on the access system of FIG. 1.

Referring now to FIG. 2, this illustrates the format of a mini-cell used to encapsulate data items for transmission over the access system of FIG. 1. The mini-cell 10 comprises a header 100 and a payload 101. The header 100 comprises 3 bytes 1000, 1001, 1002 which together carry the necessary information, including a channel identifier (CID), a payload length indicator (LI) and an error check (EC) from which mini-cell delineation can be deduced. Where the mini-cell conforms to the ITU recommendation I.363.2, the first header byte carries the channel identifier and the remaining sixteen header bits are allocated as follows: six bits comprise the length indicator, the next five bits are available as indicator bits for other purposes and the remaining five bits comprise the header error check. The payload 101 comprises a variable number of bytes (sixteen in this example) identified as 1010, 1011, . . . up to 1025. To ease interpretation of subsequent figures, the headers are identified by including the letter H within the header outline. Payloads are identified by including within their outline a decimal number representing the length of the payload (16 in the example shown in FIG. 2). Payloads of mini-cells conforming to I.363.2 are limited to a maximum of 64 bytes.

Figure 3:
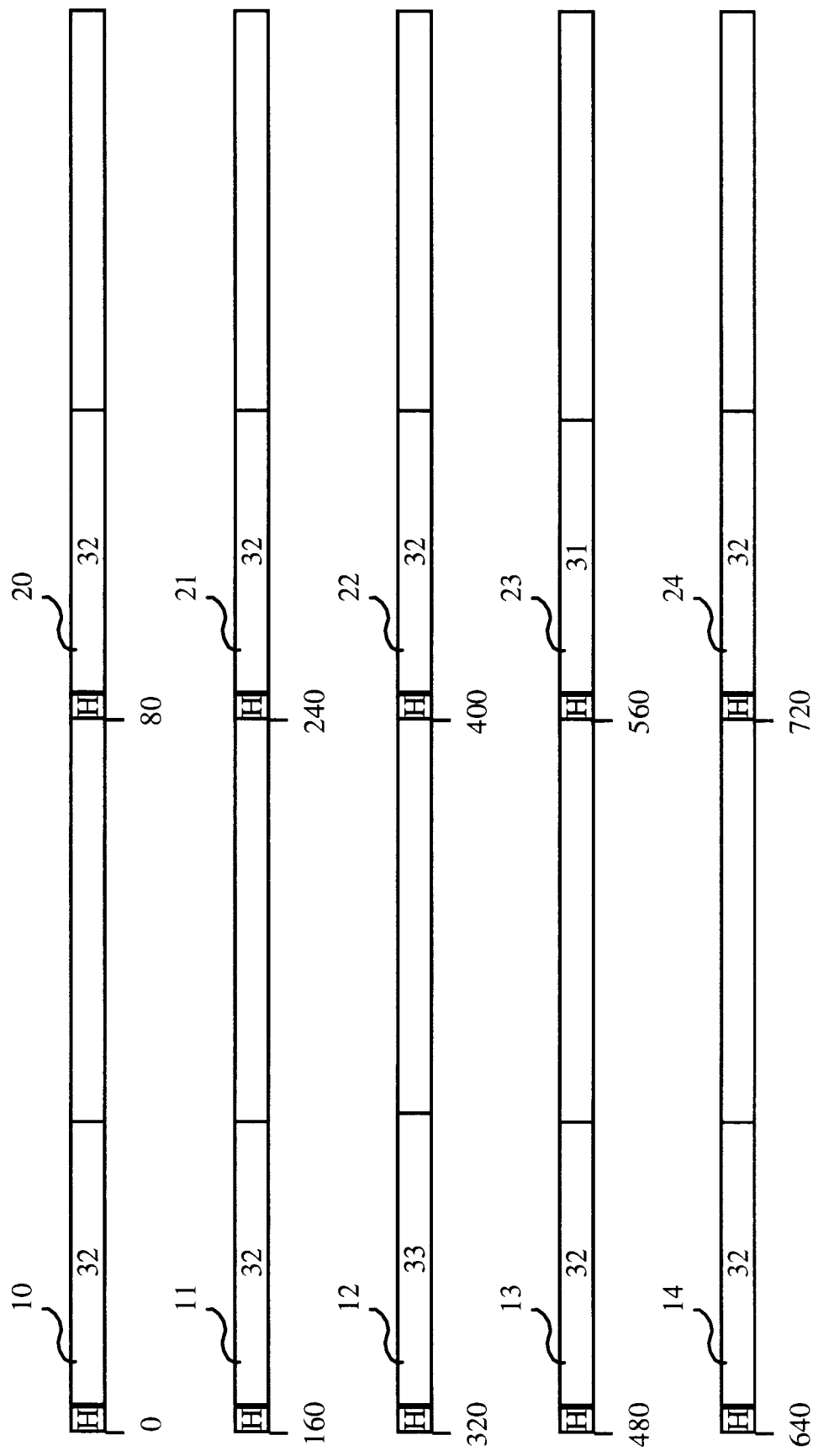
FIG. 3 illustrates the byte stream arising from the output of the multiplexer embodied in this invention when fed with plesiochronous traffic only.

FIG. 3 shows pictorially a sequence of bytes produced at the output of a multiplexer system. To aid understanding of the description, the bytes are numbered sequentially, with byte 0 at the start of the observation window. In interpreting the figure, it should be understood that the first byte of the second line of the figure (byte 160) follows on immediately from the last byte of the first line (byte 159), and similarly for subsequent lines. For the purpose of illustration, the multiplexed data stream is assumed to be running at 10240 kilobits per second (kbit/s), and carries two component plesiochronous bit streams of 2048 kbit/s (nominal) each. In FIG. 3 there is no bursty traffic component.

Information from each input data stream is assembled into mini-cells whose headers contain CIDs unique to each component stream. Mini-cells numbered 10, 11, 12, etc. arise from the first of the two component streams; mini-cells numbered 20, 21, 22, etc. arise from the second component stream. Preferred transmission opportunities are established for transmitting subsequent mini-cells. In this example, we allocate preferred transmission opportunities 125 ms apart. This time interval is a system design parameter; for telecommunications applications, 125 ms is a convenient value. At the multiplexed data rate of 10240 kbit/s this corresponds to a spacing of 160 bytes. Thus the start of mini-cell 11 is 160 bytes after the start of mini-cell 10. In between transmission opportunities, bytes from the incoming streams are accumulated in memory allocated to that incoming stream. At the start of a transmission opportunity, the number of bytes collected in the memory allocated to the relevant component stream is noted and the mini-cell header length indicator (LI) is set correspondingly. The same number of bytes are extracted from the input stream memory and included as the payload of the mini-cell. From a component stream running at 2048 kbit/s the payload will normally consist of 32 bytes. Occasionally, if a component stream is running faster than its nominal rate, the payload, such as that of mini-cell 12, may contain 33 bytes. Conversely, if a component stream is running more slowly than its nominal rate, the payload may occasionally contain 31 bytes, such as mini-cell 23.

Figure 4:
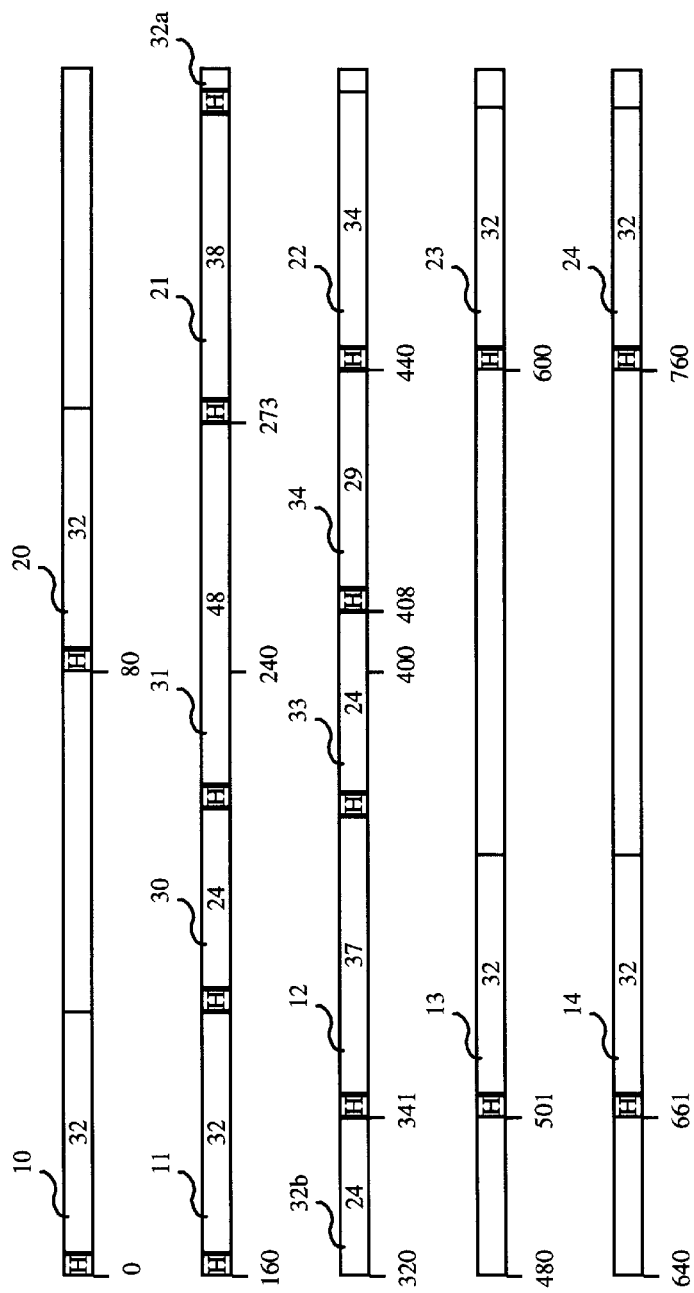
FIG. 4 illustrates the output of the multiplexer when one of the input streams carries bursty packet data.

FIG. 4 illustrates operation under the same conditions as those of FIG. 3, except that we now introduce an additional component stream of bursty traffic. The bursty traffic is assumed to have been packed into mini-cells whose CIDs do not overlap with those of the plesiochronous mini-cells and which are collected in a separate memory queue. In general, the payloads of mini-cells 30, 31, 32, etc. arising from bursty traffic will be of irregular lengths, up to the maximum permitted by the LI field (64 bytes). For the purpose of this illustration, we assume that the first bursty mini-cell 30 arrives in the input queue during transmission of plesiochronous mini-cell 11. During the period illustrated by FIG. 4 we assume that 5 bursty mini-cells arrive for transmission, numbered 30 to 34 inclusive, whose payload lengths (in order) are 24, 48, 24, 24 and 29 bytes. Note that bursty mini-cell 32 is drawn split between two lines in the figure, comprising parts 32a and 32b; this is a consequence of the way the figure is drawn and has no other significance.

If a preferred transmission opportunity for a plesiochronous mini-cell is not imminent, a bursty stream mini-cell, such as 30, may be taken from its queue and transmitted. By 'imminent' we mean scheduled within n bytes of the current time, where n is a system design parameter (which may be zero, the value illustrated in the example figures). Multiple bursty traffic mini-cells may be transmitted between plesiochronous mini-cells where preferred transmission times permit, but plesiochronous mini-cells take priority whenever their preferred transmission time arrives or is past.

In many cases, the length of such a bursty mini-cell will cause a preferred plesiochronous transmission time to be missed. In such a case (for example, following mini-cell 31) the plesiochronous mini-cell (in this case, mini-cell 21) is delayed. Where more than one plesiochronous mini-cell is delayed beyond its preferred transmission time, the cell which has been longest delayed takes priority.

When a plesiochronous mini-cell is delayed from its preferred transmission time by an interspersed bursty traffic mini-cell, bytes of traffic from this plesiochronous channel will continue to accumulate in the input buffer memory allocated to that plesiochronous channel. When the memory fill level is sampled at the start of the actual (delayed) transmission time a larger number of bytes will be measured, the increase from the nominal value being dependent on the magnitude of the time delay from the preferred transmission time. The mini-cell constructed from this accumulated information will therefore be correspondingly longer. In the case of mini-cell 21 in FIG. 4, the start is delayed by 33 bytes from the preferred time (byte 240) to byte 273 by bursty mini-cell 31. Since the multiplexed transmission rate is 5 times the nominal plesiochronous transmission rate, 6 additional bytes will have accumulated in the input buffer memory. The payload of delayed mini-cell 21 therefore contains 38 bytes instead of the expected 32.

A new preferred transmission time for this plesiochronous channel is then established 160 bytes after the actual transmission time of the delayed mini-cell, namely at byte 433. In the illustrated case, this subsequent mini-cell 22 is also delayed from its preferred transmission time by bursty mini-cell 34. Once the bursty traffic queue is empty, plesiochronous mini-cells can be transmitted at their preferred times, as illustrated by mini-cells 13, 23, 14 and 24. The payload length of these un-delayed mini-cells will then revert to 32 bytes (nominal) unless delayed by a further bursty mini-cell.

Figure 5:
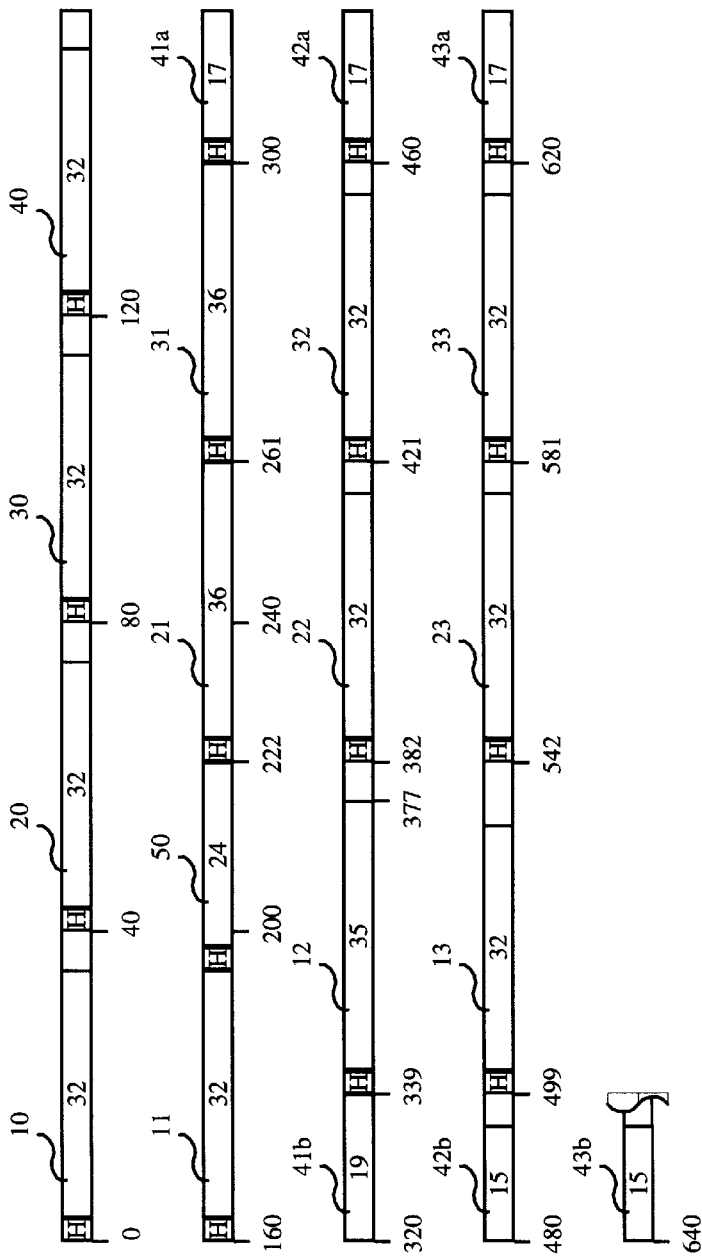
FIG. 5 illustrates the output of the multiplexer when loaded with more plesiochronous input traffic.

FIG. 5 illustrates operation under more heavily loaded conditions than in FIGS. 3 and 4. Here, four component plesiochronous streams all at 2048 kbit/s (nominal) are multiplexed together with bursty traffic onto a single connection of 10240 kbit/s as before. Mini-cells from the first of these component streams are numbered 10, 11, 12 etc., mini-cells from the second component stream are numbered 20, 21, 22, etc., from the third component stream: 30, 31, 32, etc. and from the fourth: 40, 41, 42, etc. In some cases, particularly where the level of traffic is high, cumulative delays can cause a plesiochronous mini-cell to delay a plesiochronous mini-cell from one or more other channels. In FIG. 4, mini-cell 21, itself delayed by bursty mini-cell 50, delays mini-cell 31, which itself delays mini-cell 41. 41 then delays 12. Following mini-cell 12, and assuming no more bursty mini-cells have entered the queue in the meantime, mini-cell 22 and subsequent mini-cells are transmitted at their preferred times. Plesiochronous mini-cells delayed by other plesiochronous mini-cells are thus handled in the same way as when plesiochronous mini-cells are delayed by bursty traffic.

Once a bursty traffic mini-cell 50 is queued for transmission (after mini-cell 11 in FIG. 5) plesiochronous mini-cells quickly lose any regular time spacing, but the absolute priority of delayed plesiochronous mini-cells ensures that the ultimate delay is bounded and any resulting irregularity in the transmission of plesiochronous traffic over the multiplexed link can therefore be smoothed by a suitably dimensioned buffer at the receiving demultiplexer.

We now describe with reference to FIGS. 6 to 9 an example implementation of a system to transmit multiplexed data channels according to a preferred embodiment of this invention.

Figure 6:
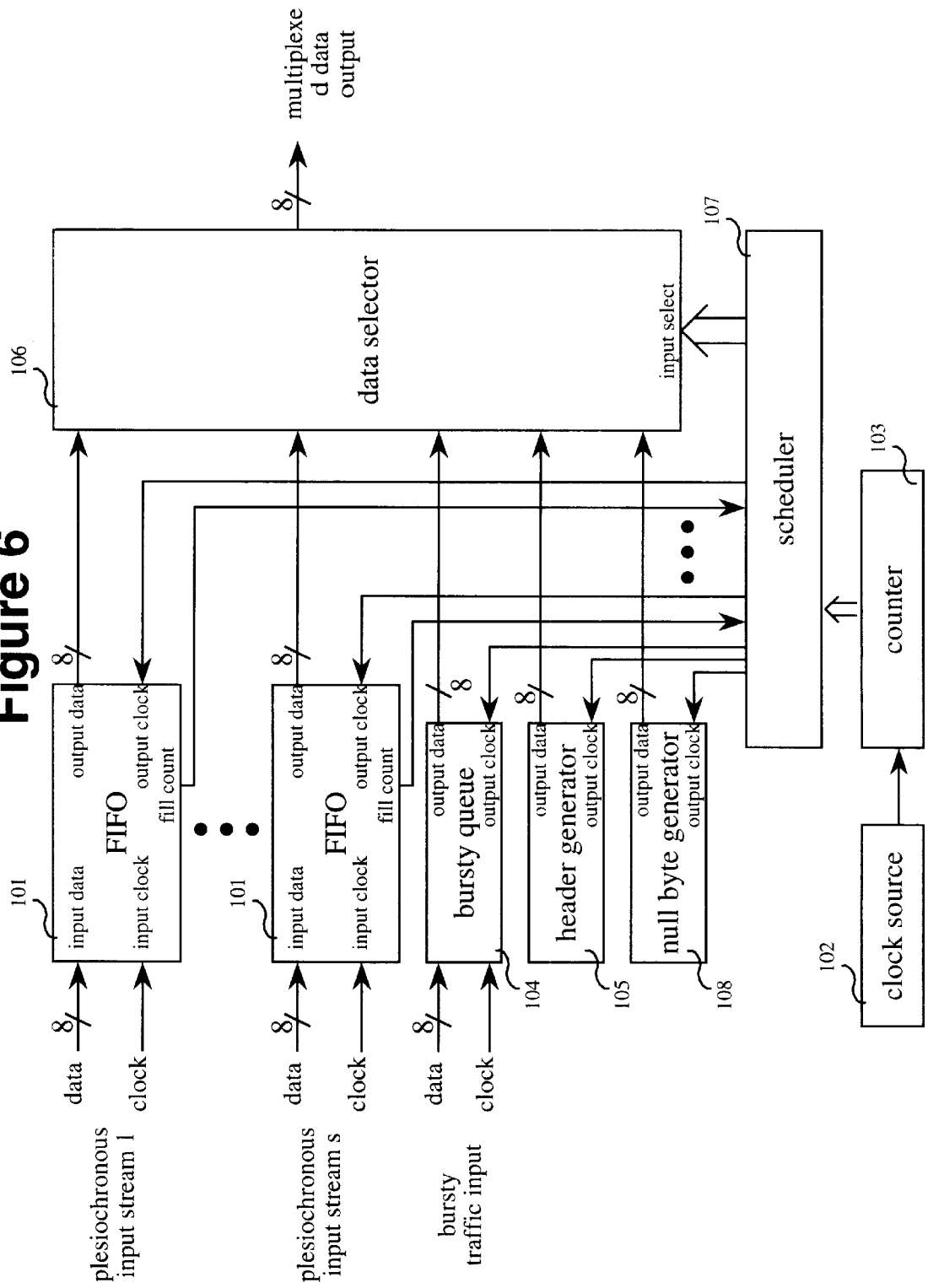
FIG. 6 shows a simplified block diagram of example apparatus to perform the multiplexing function.

FIG. 6 shows a simplified block diagram of an example apparatus to generate a multiplexed transmission signal from a plurality of plesiochronous component streams and a bursty component stream. This figure illustrates one example implementation based on byte wide data paths. Other implementations, including implementations based on data paths of different widths, are also possible. Design detail is omitted from the figure, but will be evident to those skilled in the art of logic design.

For each plesiochronous input stream, such as plesiochronous input stream 1, there is a first in first out (FIFO) memory 101. For the purposes of this illustration we assume that the input data stream has already been converted to byte-wide format by circuitry not included in the figure. This FIFO memory is similar in operation to commercially available FIFO integrated circuits, except that an additional output is required giving the number of bytes currently in the FIFO memory. Bytes of incoming data are clocked into the FIFO by the input clock signal, which is derived from the incoming plesiochronous data stream and is therefore not, in general, synchronous with any other local clock signal. As each input byte arrives, the value of the byte counter increases by one. At the scheduled transmission time, bytes are clocked out of the FIFO at the multiplexed transmission byte clock rate. Each time a byte is clocked out of the FIFO the value of the byte counter decreases by one. The local transmit clock source 102 drives a counter 103 which indicates local 'time' in clock pulse increments. A separate memory queue 104 is provided for bursty traffic mini-cells. The bursty mini-cells arriving at buffer memory 104 already have headers attached. Headers for plesiochronous mini-cells are generated by header generator 105. A data selector 106 selects the source of bytes to be transmitted as the multiplexed signal output. A scheduler 107 controls the operation of data selector 106, determines the contents of the header produced by header generator 105 and controls the output clock signals to the plesiochronous channels FIFOs 101 and the bursty queue memory 104. A null byte generator 108 is included to force transmission of a known code if no other transmission source is scheduled.

Figure 7:
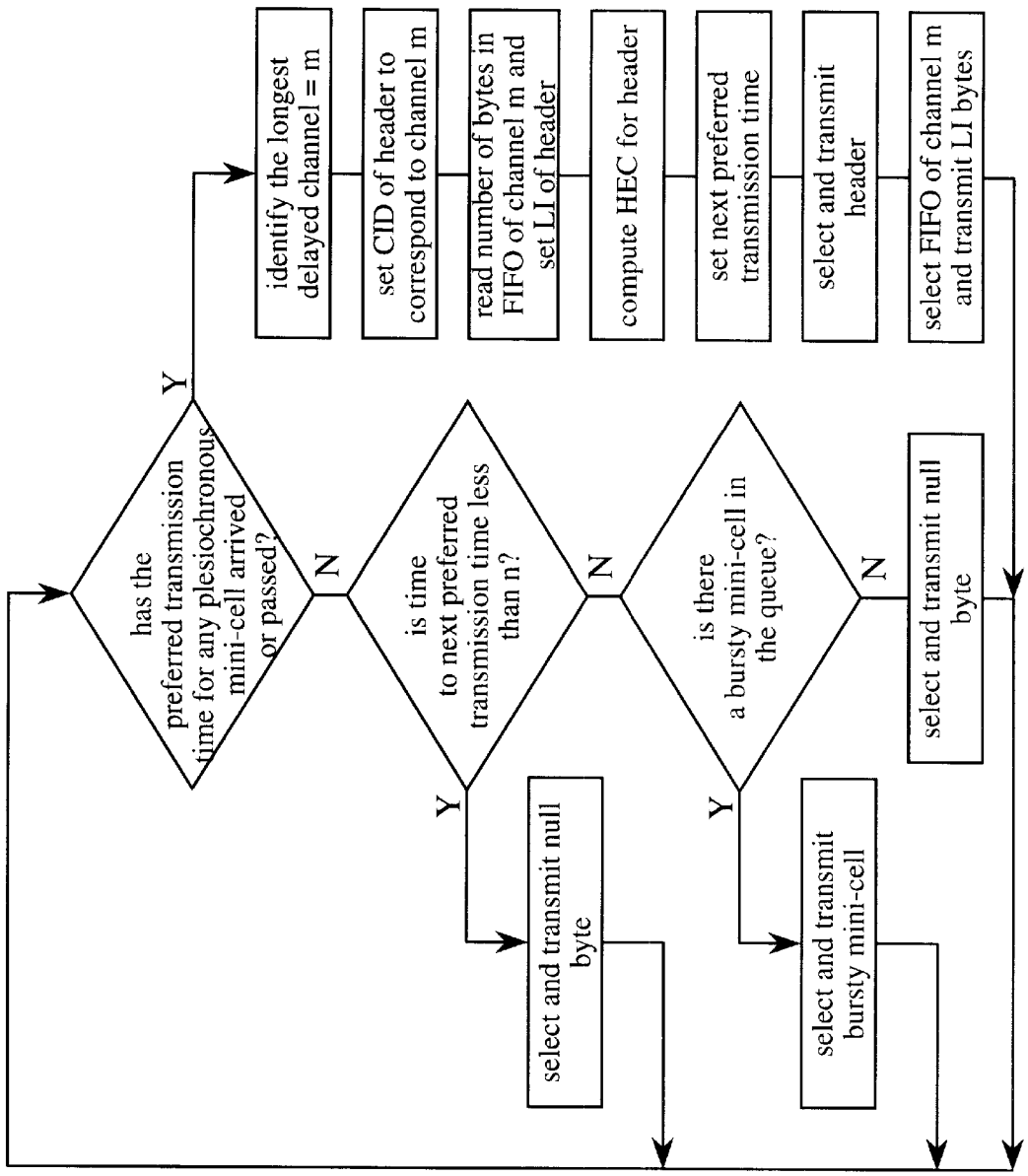
FIG. 7 shows a flow diagram of part of the functionality shown in FIG. 6.

In a practical implementation it is likely that the scheduler 107 will be at least partially implemented using an embedded software or firmware algorithm. It is therefore appropriate to describe the operation of the scheduler in functional terms using a flow diagram rather than using a detailed logic diagram. This is illustrated in FIG. 7. In interpreting this flow diagram, time is measured in terms of periods of the local clock source 102 as measured by counter 103.

Figure 8:
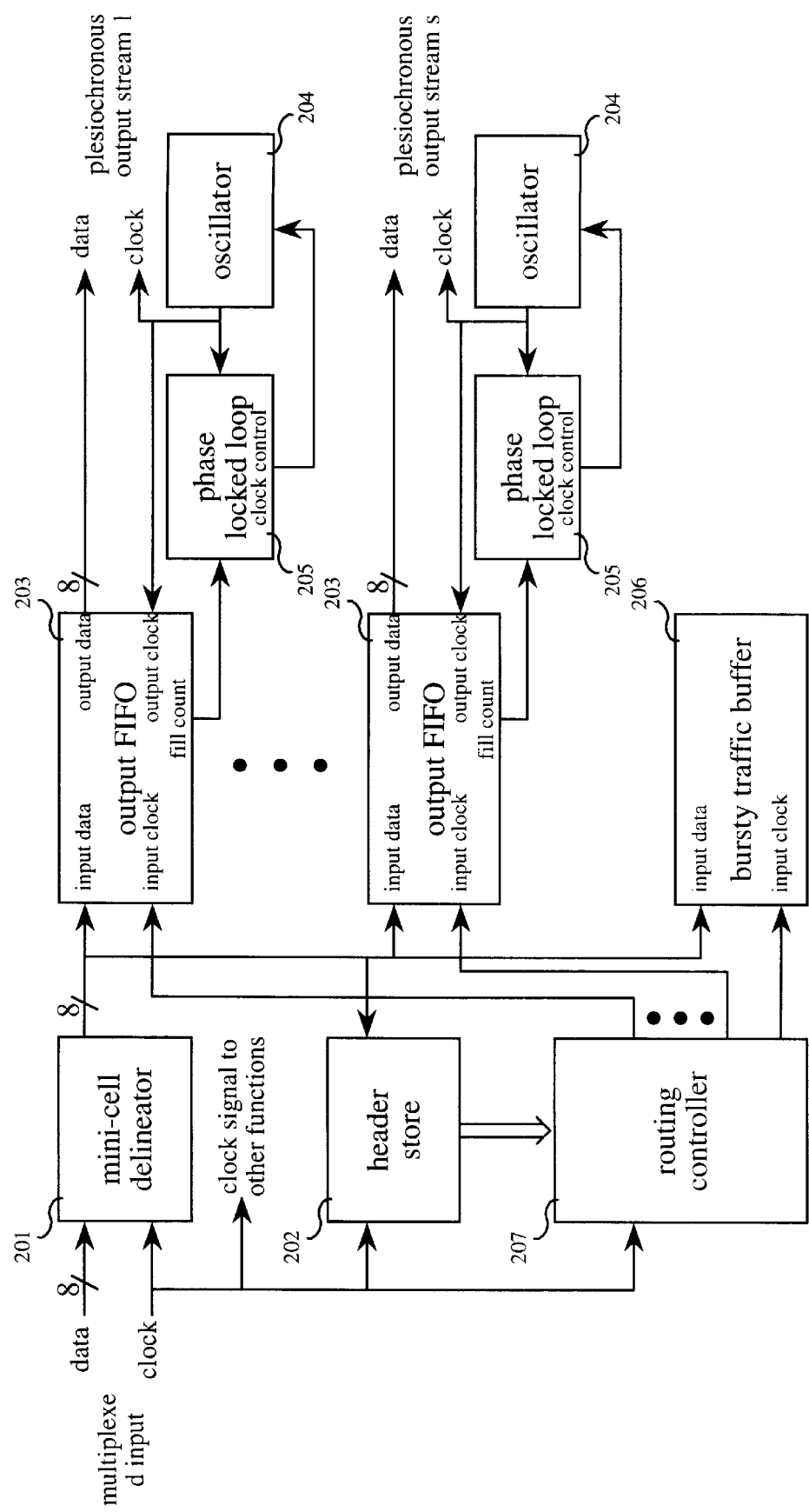
FIG. 8 shows a simplified block diagram of example apparatus to perform the demultiplexing function and FIG. 9 shows a flow diagram of part of the functionality shown in FIG. 8.

FIG. 8 shows a simplified block diagram of an example apparatus to demultiplex the multiplexed transmission signal generated by apparatus illustrated in FIG. 6. Again, other implementations are possible and detailed design information is omitted.

Incoming bytes, recovered from the transmitted multiplexed data stream arrive at a mini-cell delineator 201. The clock signal used to synchronise operation of the demultiplexer is also derived from the incoming multiplexed data stream. The mini-cell delineator identifies the header fields and passes them to a temporary header store 202. Null bytes occurring between mini-cells are ignored by delineator 201. Each plesiochronous output channel comprises an output FIFO 203, a variable frequency oscillator 204 and a phase locked loop 205. The phase locked loop 205 controls the frequency of the oscillator such that the average fill level of the corresponding output FIFO is maintained at a predetermined design level, chosen such that the FIFO never becomes empty under normal operating conditions. The phase locked loop function includes filtering to ensure that the jitter present in the output clock signal is maintained within acceptable design limits. For bursty traffic, a buffer 206 is included.

Routing of data bytes recovered by delineator 201 is determined by a routing controller 207 using the contents of the header saved in header store 202. For each incoming mini-cell the routing controller reads the channel identifier from the header store 202. If the channel identifier indicates that the mini-cell corresponds to a plesiochronous channel, the number of payload bytes specified by the length indicator are clocked into the appropriate output FIFO 203. If the channel identifier indicates that the incoming mini-cell is a bursty traffic mini-cell then the header is copied into the bursty traffic output buffer 206 followed by the appropriate number of payload bytes from the incoming data stream, as specified by the length indicator. Since the number of bytes clocked into the output FIFO of a plesiochronous channel is equal to the number originally read from the corresponding input FIFO 101 of the transmitting multiplexer illustrated in FIG. 6, the phase locked loop 205 ensures that the output clock frequency generated by oscillator 204 matches the frequency of the input clock of the corresponding plesiochronous input stream.

Figure 9:
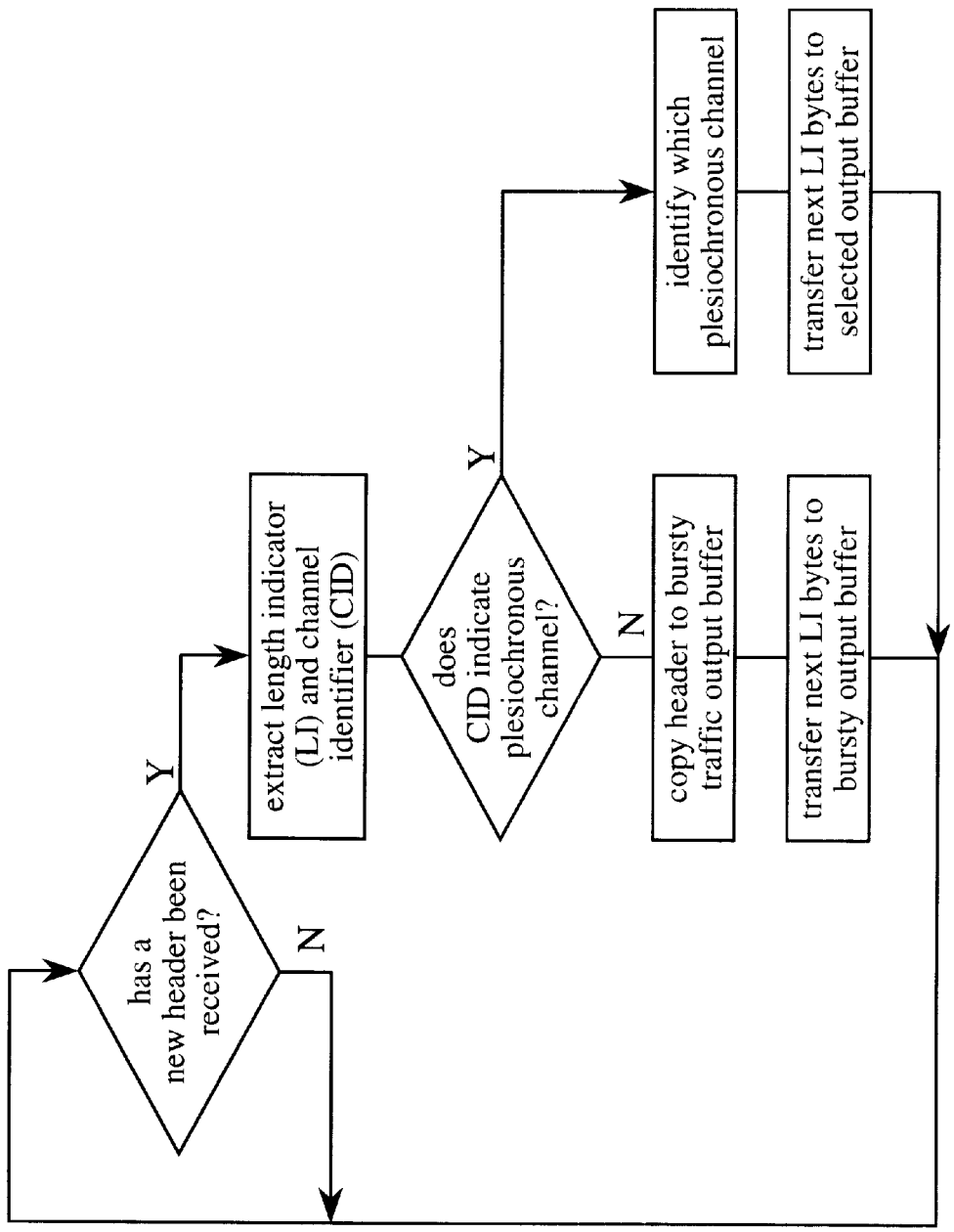

In a practical implementation it is likely that the routing controller 207 will be at least partially implemented using an embedded software or firmware algorithm. We therefore describe the operation of the routing controller in functional terms using a flow diagram rather than using a detailed logic diagram. This is illustrated in FIG. 9.

We now describe a number of optional enhancements to the basic system described above. These enhancements are intended to improve the response of the system to transmission errors which may occur on the path between the multiplexer and the demultiplexer, in particular errors which affect the contents of a mini-cell header.

An error which affects the value of the channel identifier of a plesiochronous data channel will cause misdirection of the associated payload, generally resulting in the loss of the corresponding number of bytes from the demultiplexed output stream. This in turn will cause loss of synchronisation in the apparatus which receives the demultiplexed plesiochronous stream. In many cases it is desirable to maintain channel synchronisation even if part of the data content is lost or otherwise corrupted. Where an input plesiochronous stream contains structured data, it is possible to identify the frame boundaries of the structured stream at the input to the multiplexer. Integrated circuits which perform this function are commercially available. In an enhancement to the basic system described in this invention, the input circuit of each plesiochronous channel contains a function to identify the frame boundaries of a structured stream. Each mini-cell carrying data from this stream then also carries, at a known point in the payload, a parameter which indicates the relationship between the frame boundary and the data elements contained in the mini-cell. Example means by which this can be achieved are by inserting a pointer which indicates where in the payload the frame boundary occurs, or by inserting a value which specifies the position in the frame occupied by the first data byte transmitted in the current payload. Other methods are also possible. This parameter can then be checked at the receiving demultiplexer to ensure that the correct number of bytes have been received for that channel, since the number of data bytes between frame boundaries is fixed and known. The routing controller in the demultiplexer then adds extra bytes (or, if necessary, drops bytes) from the relevant output FIFO to ensure that the correct number of bytes are transmitted onward from the demultiplexer and that frame synchronisation is maintained.

Preferably, the length of the frame should be several times larger than the preferred length of the corresponding plesiochronous mini-cell to allow the loss of multiple whole mini-cells to be detected, since if the length of a mini-cell is equal to the frame length, then loss of the complete mini-cell might not be detected.

A similar scheme can be applied to non-structured plesiochronous streams by generating an artificial framing point at regular intervals of, for example, 128 bytes.

An error which affects the length indicator of a mini-cell header will cause loss of mini-cell delineation. The delineator must then enter its hunt mode until the mini-cell boundary has been located with sufficient confidence. In a further enhancement to this invention, there is transmitted periodically a robust delineation cell. This mini-cell has a known channel identifier and length and has a short payload of known or predictable content. When detected at the receiver during the hunt phase, the known header values and payload content give an immediate high level of confidence that correct delineation has been achieved.

In a further enhancement, the multiplexed data stream is enclosed within a frame structure. Every f bytes, where f is a system design parameter, a framing signal is inserted into the multiplexed data stream. This framing signal consists of one or more bytes. At least part of one byte has a value chosen to be recognisable at the receiver as a framing signal, though it need not be uniquely recognisable. Included as part of the framing signal is a pointer which indicates to the delineation circuit in the receiving demultiplexer the offset in the transmitted multiplex of the next mini-cell boundary. This is then used in the receiver to establish immediately the correct delineation of the incoming signal. Since this framing signal occurs at known positions in the multiplexed frame, the framing bytes can be removed by the framing circuit at the receiver prior o passing the byte stream to the delineation circuit, such that, under normal circumstances, delineation is not affected. Circuits for detecting frame boundary markers are commonly used in telecommunications equipment.

Where a plesiochronous input stream carries a structured signal where not all of the timeslots carry useful information, a further enhancement to the system allows only those channels carrying useful information to be transmitted. A filtering circuit block is inserted before the transmit FIFO 101 corresponding to the partially filled framed channel. This circuit block holds a map which is configured by management messages or otherwise to identify those channels which contain useful information. Bytes corresponding to these useful channels are clocked into the FIFO while other bytes are dropped. A corresponding circuit is added preceding the corresponding FIFO 203 in the receive demultiplexer. This circuit also holds a map configured with the channel occupancy data included in the transmitter map. The circuit identifies the frame boundary in the incoming partially filled stream and inserts additional null bytes into the demultiplexer FIFO at positions which the map indicates as unused. In this way the correct number of bytes arrive in the demultiplexer FIFO to produce the reconstructed framed output stream, with unused positions filled with null bytes.

It is common practice in bidirectional transmission systems to include facilities to loop back the transmitted signal in the far end demultiplexer such that the outgoing signal is returned to the transmitting end for testing and diagnostic purposes. We observe that, in a bidirectional system where each end includes both a multiplexer and a demultiplexer, loop back can be achieved on an individual channel basis by passing mini-cells with the appropriate header value directly from the far end demultiplexer to the far end multiplexer, for return transmission in place of mini-cells derived from the far end plesiochronous input stream.

It will be understood that the above description of a preferred embodiment is given by way of example only and that various modifications may be made by those skilled in the art without departing from the spirit and scope of the invention.

We claim:

1. A method of multiplexing one or more data channels carrying plesiochronous traffic together with lower priority asynchronous data traffic into a single composite data stream for transmission over a transmission link from an exchange to a user station, the method comprising packing said plesiochronous traffic into variable length minicells each comprising a number of payload bytes and a header element containing channel identification information and a packet length indicator; assigning to each said minicells containing plesiochronous data packet a transmission time such that a predetermined data rate for the plesiochronous data packets is achieved when packets containing a preferred number of bytes are transmitted at the preferred time intervals, wherein the number of payload bytes in each minicell containing said plesiochronous traffic is varied to account for timing differences between the plesiochronous traffic and the transmission over the transmission link.

2. A method as claimed in claim 1, wherein the minicells containing said plesiochronous traffic are delayed beyond a preferred transmission time whenever another minicell is already in transmission, and wherein the number of payload bytes of plesiochronous traffic contained in each delayed minicell is increased to compensate for incoming plesiochronous traffic that has accumulated during the time period for which that minicell has been delayed.

3. A method as claimed in claim 2, wherein the preferred transmission times for subsequent plesiochronous traffic channel minicells for the same channel as a delayed minicell are also delayed by a similar amount.

4. A method as claimed in claim 3, wherein transmission of lower priority asynchronous data minicells is permitted only when n contiguous bytes are available before the next preferred plesiochronous minicell transmission time where n is a system configuration parameter.

5. A method as claimed in claim 4, wherein an additional data field parameter is included in a plesiochronous traffic channel minicell from which the position of a frame boundary in the plesiochronous traffic channel can be deduced where that plesiochronous traffic channel contains frame structured data.

6. A method as claimed in claim 5, where one or more of the plesiochronous traffic channels contains frame structured data in which some of the time slots are unused and where the preferred plesiochronous minicell payload length is reduced by omitting data elements corresponding to one or more of the unused time slots.

7. A method as claimed in claim 6, where one or more of the plesiochronous traffic channels contains frame structured data in which some of the time slots are unused and wherein the preferred time interval between successive minicells is increased by omitting data elements corresponding to one or more of the unused time slots.

8. A method as claimed in claim 4, wherein a local frame boundary marker is generated every f bytes of a plesiochronous traffic channel where f is a system configuration parameter, and wherein an additional data field parameter is included in a plesiochronous traffic minicell from which the said local frame boundary marker can be located.

9. A method as claimed in claim 8, wherein the header element containing channel identification information and the length indicator also includes one or more parity check binary digits and where the identification of a sequence of binary digits with correct parity serves to delineate the minicell boundaries.

10. A method as claimed in claim 9, wherein said delineation is effected by transmitting periodically a delineation packet with predictable payload contents.

11. A method as claimed in claim 9, wherein said delineation is effected by transmitting a frame boundary marker at a predictable time with respect to the transmission channel clock rate, and wherein the frame boundary marker includes a parameter from which the start of the next minicell boundary can be deduced.

12. A method as claimed in claim 1, wherein at least part of the asynchronous data traffic comprises an embedded operations channel.

* * * * *